United States Patent
Pemba et al.

(10) Patent No.: US 10,468,019 B1
(45) Date of Patent: Nov. 5, 2019

(54) SYSTEM AND METHOD FOR AUTOMATIC SPEECH RECOGNITION USING SELECTION OF SPEECH MODELS BASED ON INPUT CHARACTERISTICS

(71) Applicant: Kadho, Inc., Irvine, CA (US)

(72) Inventors: Dhonam Pemba, Toluca Lake, CA (US); Kaveh Azartash, Newport Beach, CA (US)

(73) Assignee: Kadho, Inc., Irvine, CA (US)

( * ) Notice: Subject to any disclaimer, the term of this patent is extended or adjusted under 35 U.S.C. 154(b) by 0 days.

(21) Appl. No.: 15/796,152

(22) Filed: Oct. 27, 2017

(51) Int. Cl.
| | |
|---|---|
| *G10L 15/18* | (2013.01) |
| *G10L 15/187* | (2013.01) |
| *G10L 15/02* | (2006.01) |
| *G10L 15/30* | (2013.01) |
| *G10L 15/14* | (2006.01) |
| *G10L 15/22* | (2006.01) |
| *G10L 15/16* | (2006.01) |

(52) U.S. Cl.
CPC .......... *G10L 15/187* (2013.01); *G10L 15/02* (2013.01); *G10L 15/142* (2013.01); *G10L 15/16* (2013.01); *G10L 15/22* (2013.01); *G10L 15/30* (2013.01); *G10L 2015/025* (2013.01)

(58) Field of Classification Search
CPC ......... G10L 15/06; G10L 15/07; G10L 15/18; G10L 15/183; G10L 15/22; G10L 15/24
See application file for complete search history.

(56) References Cited

U.S. PATENT DOCUMENTS

| | | | | | |
|---|---|---|---|---|---|
| 5,865,626 | A * | 2/1999 | Beattie | ............... | G09B 19/04 434/185 |
| 5,953,701 | A * | 9/1999 | Neti | ............... | G10L 15/142 704/240 |
| 6,085,160 | A * | 7/2000 | D'hoore | ............... | G09B 19/06 704/2 |
| 6,567,776 | B1 * | 5/2003 | Chang | ............... | G10L 15/063 704/236 |
| 7,058,573 | B1 * | 6/2006 | Murveit | ............... | G10L 15/08 704/229 |
| 8,229,744 | B2 * | 7/2012 | Dharanipragada | ..... | G10L 15/02 704/256 |
| 8,788,256 | B2 * | 7/2014 | Chen | ............... | G10L 15/187 434/156 |
| 9,601,111 | B2 * | 3/2017 | Winter | ............... | G10L 15/07 |
| 2003/0191639 | A1* | 10/2003 | Mazza | ............... | G10L 15/183 704/231 |
| 2004/0210438 | A1* | 10/2004 | Gillick | ............... | G10L 15/005 704/254 |
| 2006/0020462 | A1* | 1/2006 | Reich | ............... | G10L 15/187 704/254 |
| 2011/0295590 | A1* | 12/2011 | Lloyd | ............... | G10L 15/065 704/8 |

(Continued)

*Primary Examiner* — Jialong He
(74) *Attorney, Agent, or Firm* — Clause Eight IPS; Michael Catania

(57) ABSTRACT

A method and system method for automatic speech recognition using selection of speech models based on input characteristics is disclosed herein. The method includes obtaining speech data from a speaker utilizing a microphone or an audio upload. The system and method select the best speech recognition model to automatically decode the input speech and continuously update models by updating/creating models in a database based on users speech abilities.

7 Claims, 11 Drawing Sheets

(56) References Cited

U.S. PATENT DOCUMENTS

| | | | |
|---|---|---|---|
| 2013/0346077 A1* | 12/2013 | Mengibar | G10L 15/265 704/235 |
| 2014/0136210 A1* | 5/2014 | Johnston | G10L 15/07 704/275 |
| 2016/0140964 A1* | 5/2016 | Connell, II | G10L 15/25 704/231 |
| 2017/0154640 A1* | 6/2017 | Wang | G10L 17/04 |

* cited by examiner

SYSTEM AND METHOD FOR AUTOMATIC SPEECH RECOGNITION USING SELECTION OF SPEECH MODELS BASED ON INPUT CHARACTERISTICS

CROSS REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION

Field of the Invention

The present invention generally relates to a speech recognition system.

Description of the Related Art

Speech recognition systems are built by training the system on input acoustic data and transcript speech corpus. This training process leads to a model which is later used to decode new speech into text. The input data results in the models performance on decoding speech, if a model is trained on adult native speakers, it will have difficulty decoding non native, noisy, children and other forms speech that differs from the training data. There is a need to produce an automatic speech recognition system that can handle various cases of speech including those from non-native speakers and children.

The prior art solution is to use speech utterance as input to adaptation and updating the speech model, language identification and select appropriate language speech recognizer, and speech input detection and call right model.

In one prior art solution, languages (and dialects) are considered independently, and a separate acoustic model is trained for each language from scratch. This solution uses deep learning to train a multilingual speech recognition, where some parts are shared among all languages, and other parts are trained separately.

In another prior art solution, an age group classifier is built using linear kernel Support Vector Machines] trained with the Sequential Minimal Optimisation (SMO) algorithm and this used to select which ASR system to use (children, adults, seniors).

In another prior art solution, the solution adapt/builds acoustic and language models based on users profiles distributed over a network. This isn't a system to select the model for speech recognition but to build the acoustic models based on user profiles.

In another prior art solution, the solution uses a tree-structured model for selecting a speaker-dependent model that best matches to the input speech. The solution helps build a more robust speech system that can select the appropriate model based on input speech.

In another prior art solution, the solution selects a speech model based on a length of speech.

In another prior art solution, controller configured to select an acoustic model from a library of acoustic models based on ambient noise in a cabin of the vehicle and operating parameters of the vehicle.

In another prior art solution, the solution selects a language speech system based on the score from language identification system.

BRIEF SUMMARY OF THE INVENTION

The present invention is an automatic speech recognition system and method that uses many speech models, and selects them based on the input data.

One aspect of the present invention is a method for automatic speech recognition using selection of speech models based on input characteristics. The method includes obtaining speech data from a speaker utilizing a microphone or an audio upload. The method also includes receiving speaker and environmental data. The method also includes extracting a plurality of sound features from the speech data. The method also includes classifying the speech data to generate a classified speech data. The method also includes selecting a speech recognition model for the classified speech data. The method also includes decoding the speech data into output text utilizing an automatic speech recognition system. The method also includes identifying a phoneme and a sound map for the classified speech data. The method also includes adapting at least one speech recognition model based on the text, phoneme and sound map.

Another aspect of the present invention is a system for automatic speech recognition using selection of speech models based on input characteristics. The system comprises a server comprising a processor, a sound feature extractor, a context profiler, a speech classifier, a database comprising speech model data, a plurality of speech models, and a speech recognition system. The speech data from a speaker is obtained utilizing a microphone or an audio upload. The context profiler is configured to process the speaker and environmental data. The sound feature extractor is configured to extract a plurality of sound features from the speech data. The speech classifier is configured to classify the speech data to generate a classified speech data. A server is configured to select a speech recognition model for the classified speech data. The automatic speech recognition system is configured to decode the speech data into output text. The server is configured to identify a phoneme and a sound map for the classified speech data. The server is configured to adapt at least one speech recognition model based on the text, phoneme and sound map.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
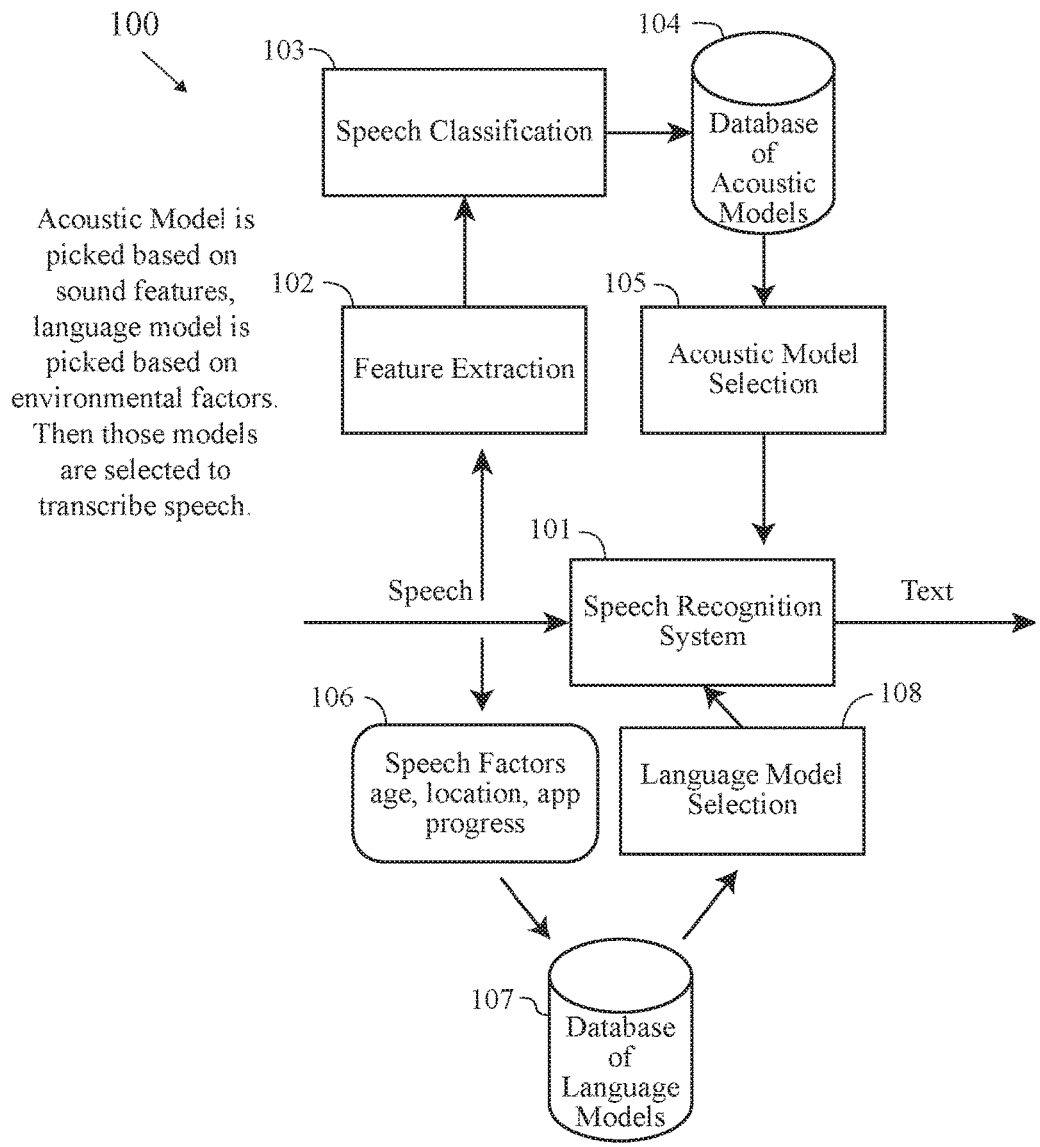
FIG. 1 is a block diagram of a method for automatic speech recognition using selection of speech models based on input characteristics.

The speech recognition system of the present invention performs well for children, adults, native, non-native, noisy and more. The speech recognition system has a database of various speech models. These speech models are very specific with custom acoustic and language data. The system uses the input sound to determine which speech model is best to use. The system selects that speech model to decode and return the transcription. The system validates the transcription and updates the speech models.

The system selects the best speech recognition model to automatically decode the input speech and continuously updates models by updating/creating models in a database based on users speech abilities.

The process extracts speech features, combining the speech features with environmental context to select a speech model to decode speech, then updates and creates a new model that can increase the model inventory. The new models update, as well as get data from a sound map. The sound maps are inventories of phoneme, syllable, lexicon and corpus of specific models. Once a user has uttered enough data to create a sound model, a model will either be updated or a new model will be created.

The system and method preferably utilizes KID SENSE speech recognition for children, and dual language speech recognition used in KADHO English and MOCHU AI.

One embodiment is a system for automatic speech recognition using selection of speech models based on input characteristics. The system comprises a server comprising a processor, a sound feature extractor, a context profiler, a speech classifier, a database comprising speech model data, a plurality of speech models, and a speech recognition system. The speech data from a speaker is obtained utilizing a microphone or an audio upload. The context profiler is configured to process the speaker and environmental data. The sound feature extractor is configured to extract a plurality of sound features from the speech data. The speech classifier is configured to classify the speech data to generate a classified speech data. A server is configured to select a speech recognition model for the classified speech data. The automatic speech recognition system is configured to decode the speech data into output text. The server is configured to identify a phoneme and a sound map for the classified speech data. The server is configured to adapt at least one speech recognition model based on the text, phoneme and sound map.

The speaker and environmental data preferably comprises at least one of a physical location of the speaker, a native speaker, a language learner, a gender of the speaker, and an age of the speaker.

A sound feature extractor of the system extracts features of the sound that can be used by the classifier to learn how to classifier speech inputs. These features could be any combination of Mel Frequency Cepstral Coefficients, Filterbank Energies, Log Filterbank Energies, Spectral Subband Centroids, Zero Crossing Rate, Energy Entropy of Energy, Spectral Centroid Spectral Spread, Spectral Entropy, Spectral Flux, Spectral Rolloff, Chroma Vector Chroma Deviation and more.

At least one of a processor, memory, and GPU is used to extract the plurality of sound features.

A context profiler collects environmental input, user profile if it registered in an application, device location, device language settings, and accomplishments/progress/levels in the software transferring the sound. The context profiler is used to process the speaker and environmental data.

The Sound/Speech Classifier is preferably one of a I-Vector, Neural Network (Feedforward, CNN, RNN), Machine Learning (k Nearest Neighbor kN, Support Vector Machines, Random forests, Extra trees and Gradient boosting.

The database is used to store speech models and tags.

The Speech Model Data is audio, transcripts, and speech files needed for training and build a speech.

The speech recognition model is preferably selected from a plurality of speech recognition models stored on a digital storage medium.

The automatic speech recognition system is used to decode speech.

The speech models are acoustic and language models that are used by the speech recognition system to decode speech. The speech recognition system is HMM (hidden markov model), GMM (gaussian mixture), GMM-HMM, DNN (deep neural network)-HMM, RNN or any speech recognition model that can decode speech based on training.

The speech model update/creation is based on the user speech profile, and sound map database. Once enough phrases have been uttered to cover the sounds required to cover the spectrum determined from an algorithm like the phoneme transitional and probability matrices, the user utterance is used to either update or create a model based on what is available in the database.

Another embodiment is a method for automatic speech recognition using selection of speech models based on input characteristics. The method includes obtaining speech data from a speaker utilizing a microphone or an audio upload, which is retrieving audio in a digital format. The method also includes receiving speaker and environmental data, which is understanding the person behind the speech, are they in a car, classroom, native speaker, language learner, male/female, child/adult. This data is transferred in digital form through memory. The method also includes extracting a plurality of sound features from the speech data, which is obtaining sound features that can be used by the classifier to classify the speech. The method utilizes Utilize computer processors, memory and/or gpu to extract sound features. The method also includes classifying the speech data to generate a classified speech data utilizing computer processors, memory and/or gpu to extract sound features. The method also includes selecting a speech recognition model for the classified speech data, which in combination with the classifier and user data, uses machine learning and/or deep learning to select the appropriate speech model. The models are saved on a digital storage medium. The database can contain digital fingerprints or tags linking to the stored models. The method also includes decoding the speech data into output text utilizing an automatic speech recognition system, which is decoding the speech into text using a trained model. The method utilizes CPU, GPU and the models data stored on the memory to decode the speech. The method also includes identifying a phoneme and a sound map for the classified speech data, which is using user data and the Phoneme Transitional Probability and Matrices to identify the phoneme and syllable range of the individual. The method also includes adapting at least one speech recognition model based on the text, phoneme and sound map. The data can be retrained and a previous model can be adopted to create a new one to increase the diversity of the model database. Data is sent to the server and the model in storage is updated.

The method further comprises analyzing the output text using confidence scoring.

The input of speech has an output of text.

The input of acoustic data has an output of a speech model.

The input Environmental Data (user info, location, language) has an output of a speech model.

The input of speech to text process has an output of more diverse speech models (acoustic data[phonemes, sounds] and language data[words, sentences]).

The input of Lexicon, phoneme, syllable, and speech corpus has an output of Refined acoustic and language models.

FIG. 1 is a block diagram of a method 100 for automatic speech recognition using selection of speech models based on input characteristics. Speech is sent to a speech recognition system at block 101. At block 102, features are extracted from the speech. At block 103, the speech is classified and sent to the database at block 104. At block 105, an acoustic model is selected and sent to the speech recognition system at block 101. At block 106, speech factors are collected and sent to the database at 107. At block 108, a language model is selected.

Figure 2:
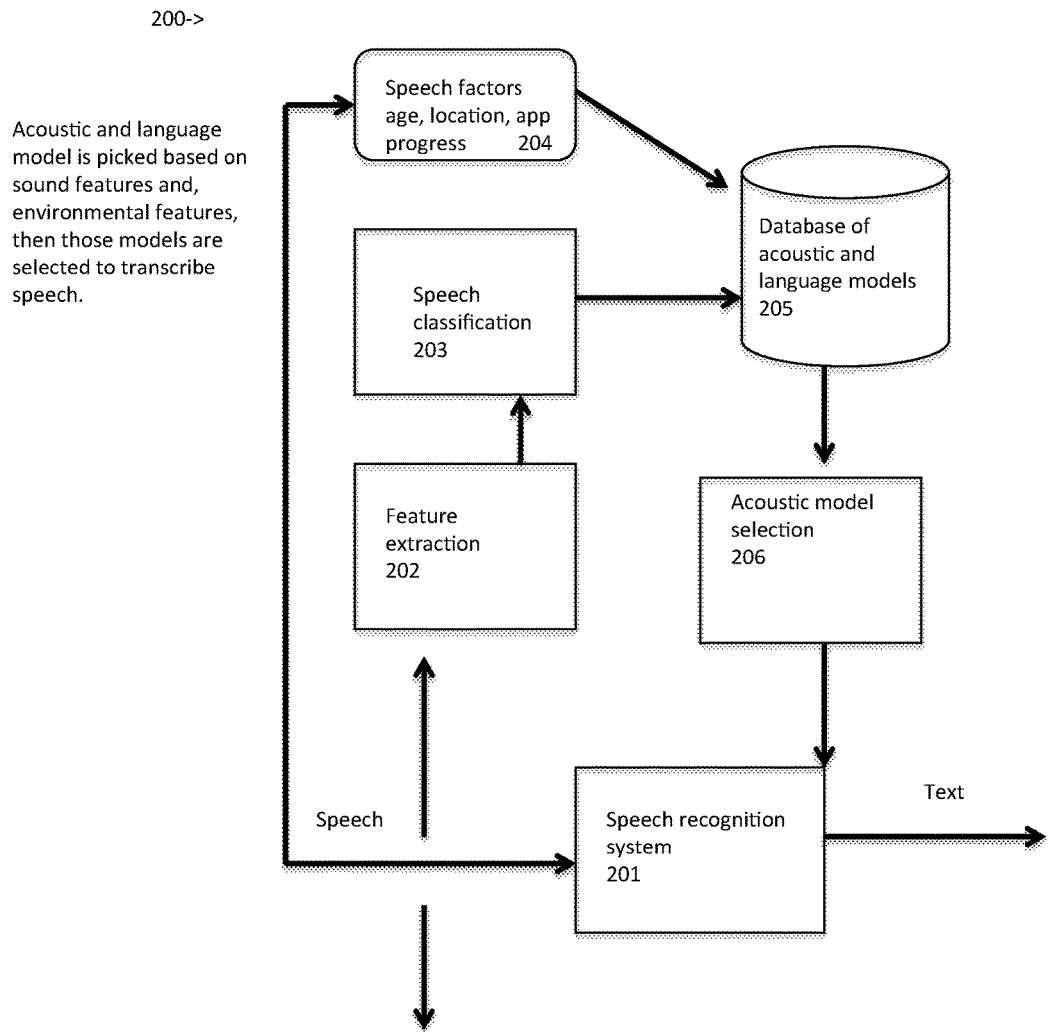
FIG. 2 is a block diagram of a method for automatic speech recognition using selection of speech models based on input characteristics.

FIG. 2 is a block diagram of a method 200 for automatic speech recognition using selection of speech models based on input characteristics. Speech is sent to a speech recognition system at block 201. At block 202, features are extracted from the speech. At block 203, the speech is classified and sent to the database at block 205. At block 204, speech factors are collected and sent to the database at 205. At block 206, an acoustic model is selected and sent to the speech recognition system at block 201.

Figure 3:
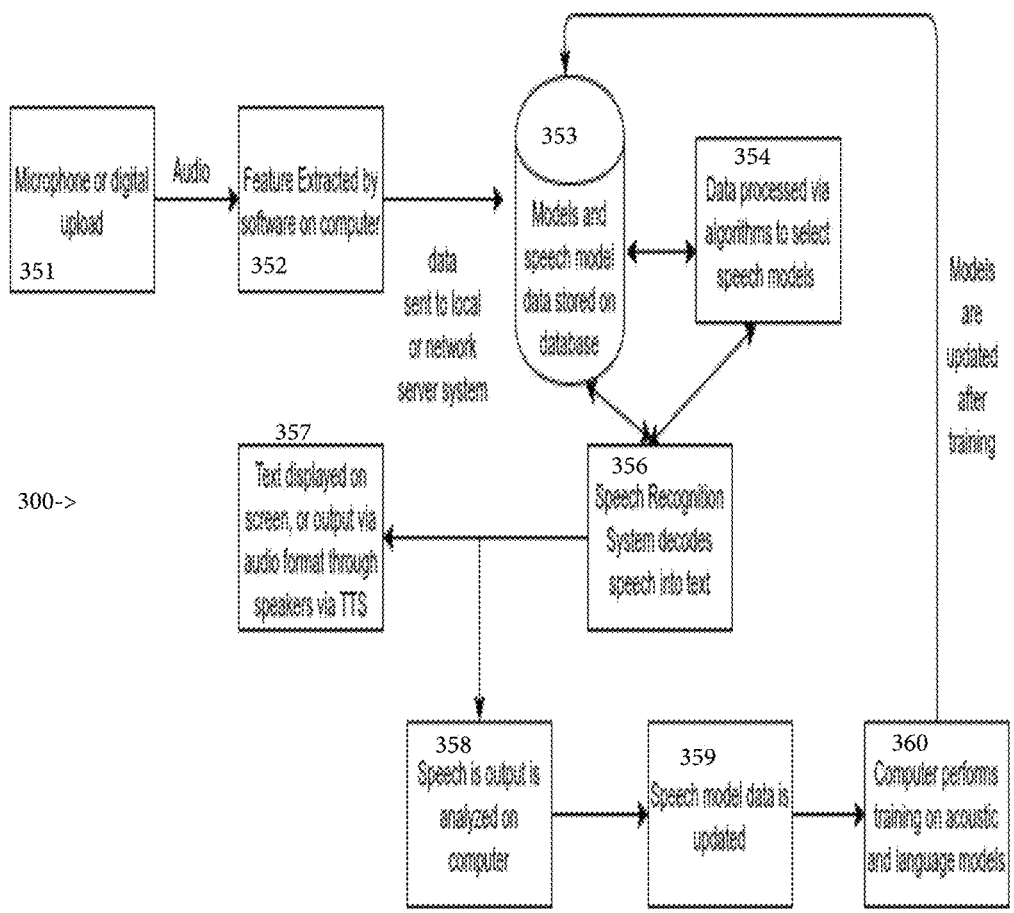
FIG. 3 is a block diagram of a method for automatic speech recognition using selection of speech models based on input characteristics.

FIG. 3 is a block diagram of a method 300 for automatic speech recognition using selection of speech models based on input characteristics. At block 351, a microphone audio or digital audio is uploaded to the system. At block 352, the features are extracted from the audio. The data is sent to a database 353, and the data is processed at block 354. At block 356, the speech is decoded into text. At block 357, the text is displayed. At block 358, the speech is analyzed on a computer. At block 359, the speech model data is updated. At block 360, the computer performs training on acoustic and language models. The models are updated after training and sent to database 353.

Figure 4:
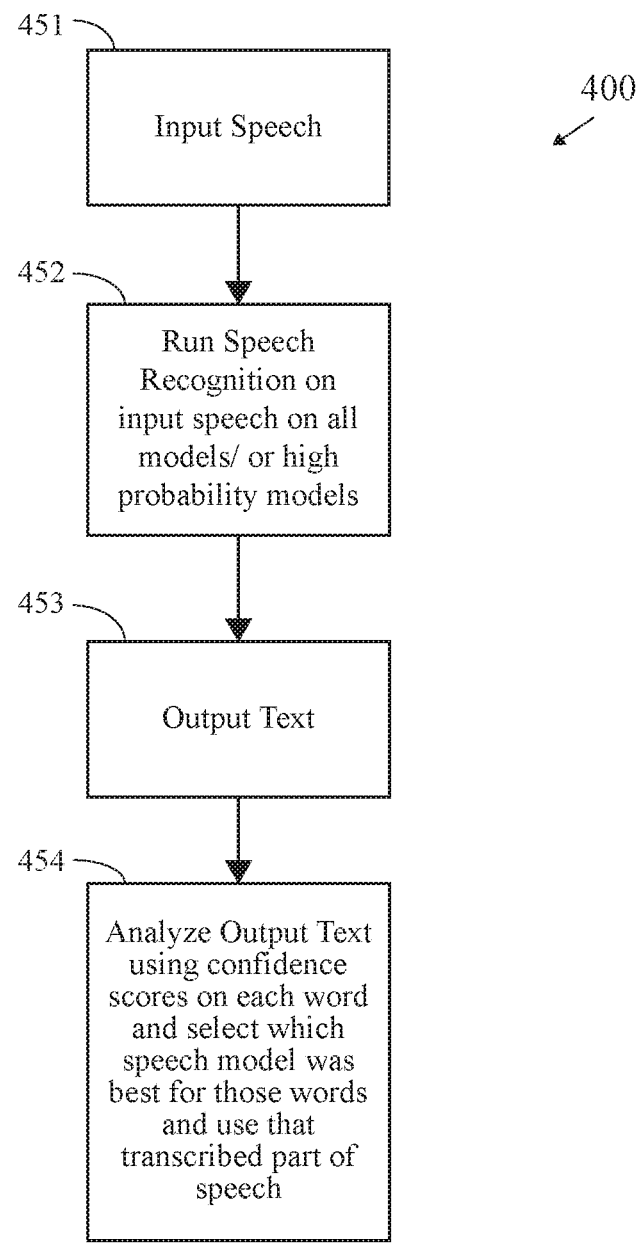
FIG. 4 is a block diagram of a score approach for a method for automatic speech recognition using selection of speech models based on input characteristics.

FIG. 4 is a block diagram of a score approach process 400 for a method for automatic speech recognition using selection of speech models based on input characteristics. At block 451, speech is inputted into the system. At block 452, a speech recognition software is run on the inputted speech. At block 453, text is outputted. At block 454, the output text is analyzed using confidence scores on each word and a speech model is selected based on what is best for those words.

Figure 5:
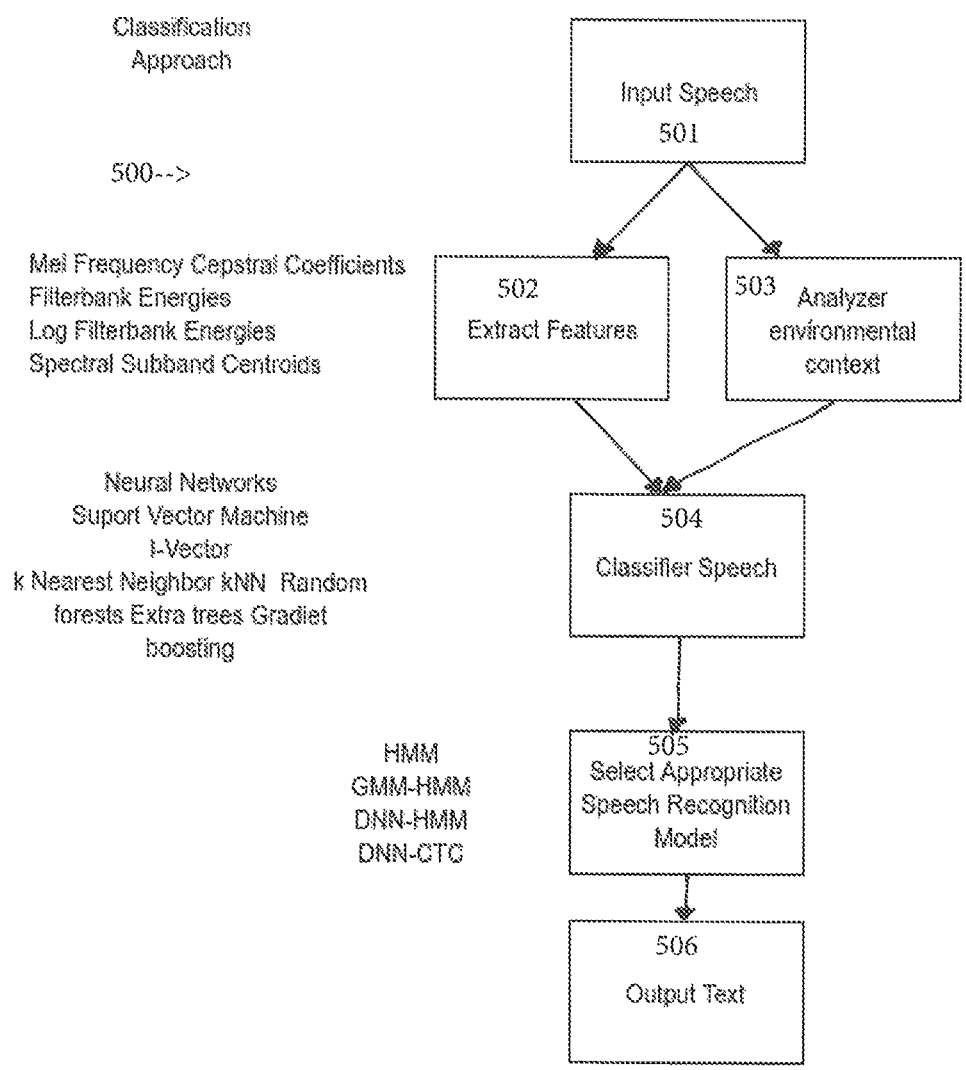
FIG. 5 is a block diagram of a classification approach for a method for automatic speech recognition using selection of speech models based on input characteristics.

FIG. 5 is a block diagram of a classification approach process 500 for a method for automatic speech recognition using selection of speech models based on input characteristics. At block 501, speech is inputted into the system. At block 502, features are extracted. At block 503, environmental context is analyzed. At block 504, the speech is classified. At block 505, the appropriated speech recognition model is selected. At block 506, the text is outputted.

Figure 6:
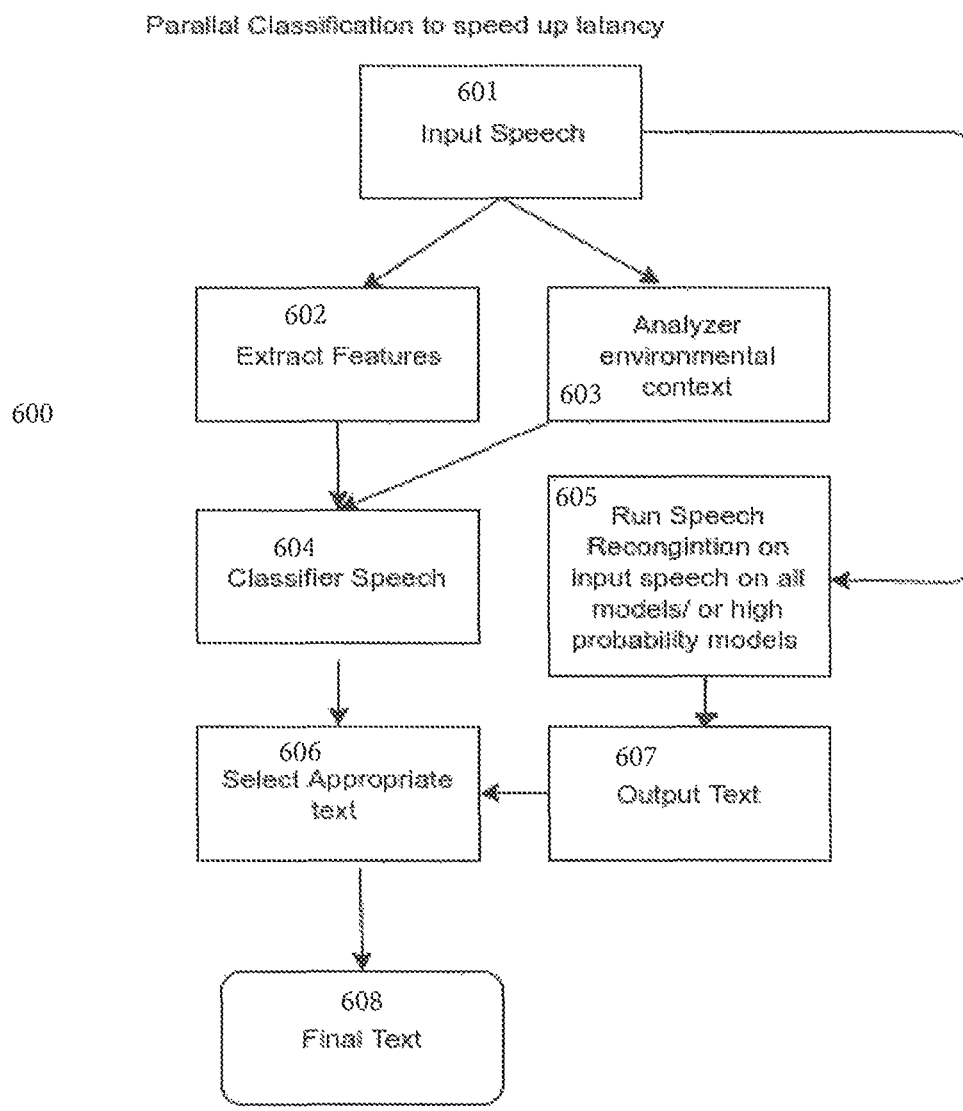
FIG. 6 is a block diagram of a parallel classification approach for a method for automatic speech recognition using selection of speech models based on input characteristics.

FIG. 6 is a block diagram of a parallel classification approach process 600 for a method for automatic speech recognition using selection of speech models based on input characteristics. At block 601, speech is inputted into the system. At block 602, features are extracted. At block 603, environmental context is analyzed. At block 604, the speech is classified. At block 605, speech recognition is run on the inputted speech. At block 606, the appropriated speech recognition model is selected. At block 607, the text is outputted. At block 608, the final text is selected.

Figure 7:
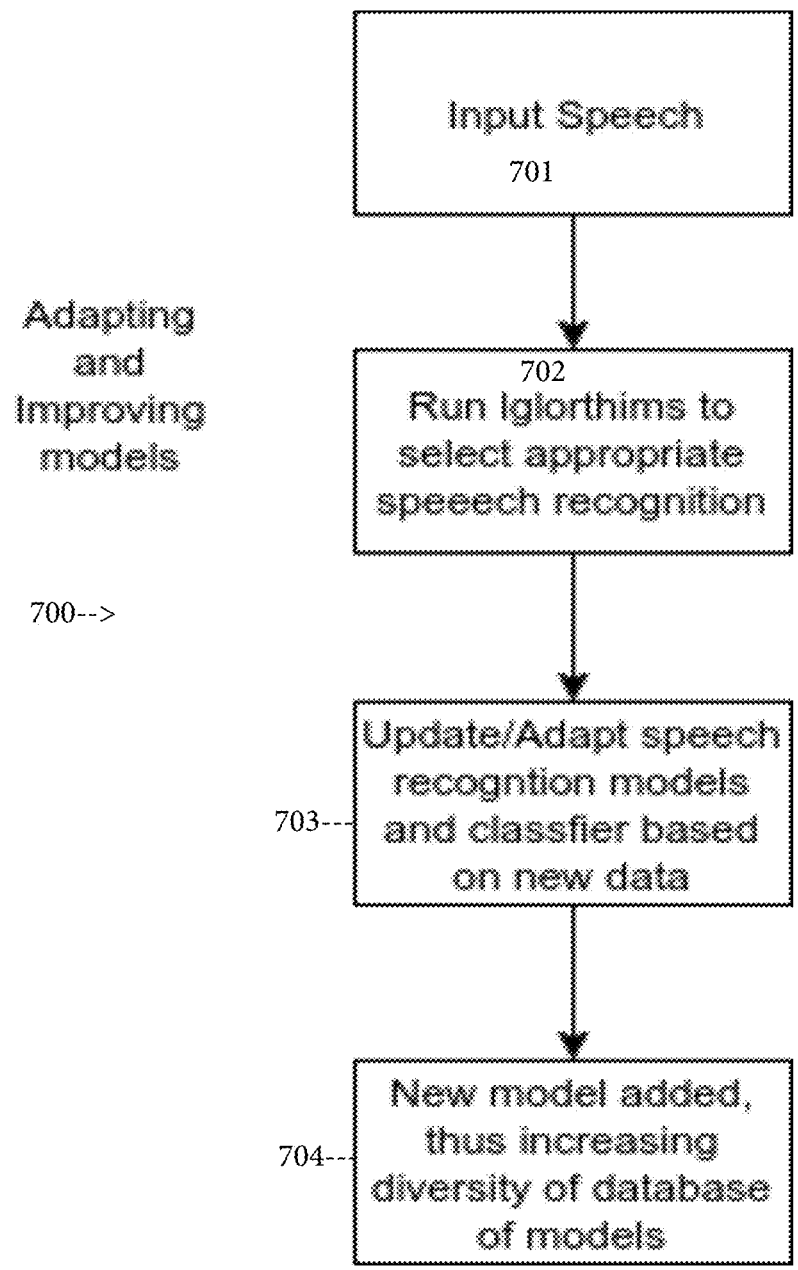
FIG. 7 is a block diagram of adapting and improving models for a method for automatic speech recognition using selection of speech models based on input characteristics.

FIG. 7 is a block diagram of adapting and improving models process 700 for a method for automatic speech recognition using selection of speech models based on input characteristics. At block 701, speech is inputted into the system. At block 702, algorithms are run to selected the most appropriate speech recognition model. At block 703, speech recognition models and classifiers are updated based on the new data. At block 704, the new/updated model is added to the database to increase the diversity of the database of speech models.

Figure 8:
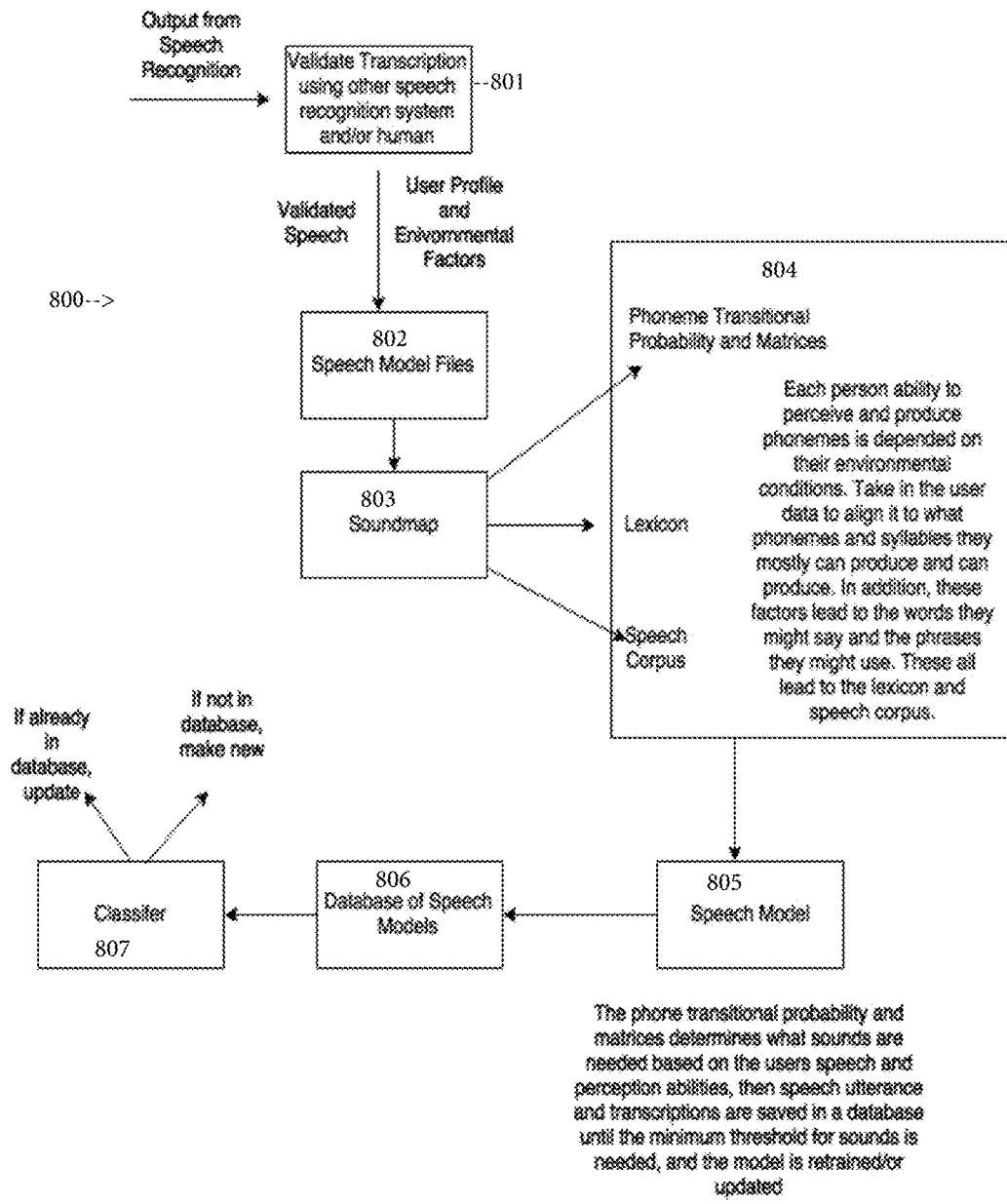
FIG. 8 is a block diagram of adapting and improving models for a method for automatic speech recognition using selection of speech models based on input characteristics.

FIG. 8 is a block diagram of adapting and improving models process 800 for a method for automatic speech recognition using selection of speech models based on input characteristics. At block 801, speech outputted from a speech recognition system is validated using other speech recognition systems or human interaction. At block 802, this data is sent to a speech model files. At block 803, a soundmap is used. At block 804, further processing using phone transitional probability and matrices is performed on the data. At block 805, the speech model is updated. At block 806, the updated speech model is sent to the database of speech models. At block 807, the updated speech model is classified.

Figure 9:
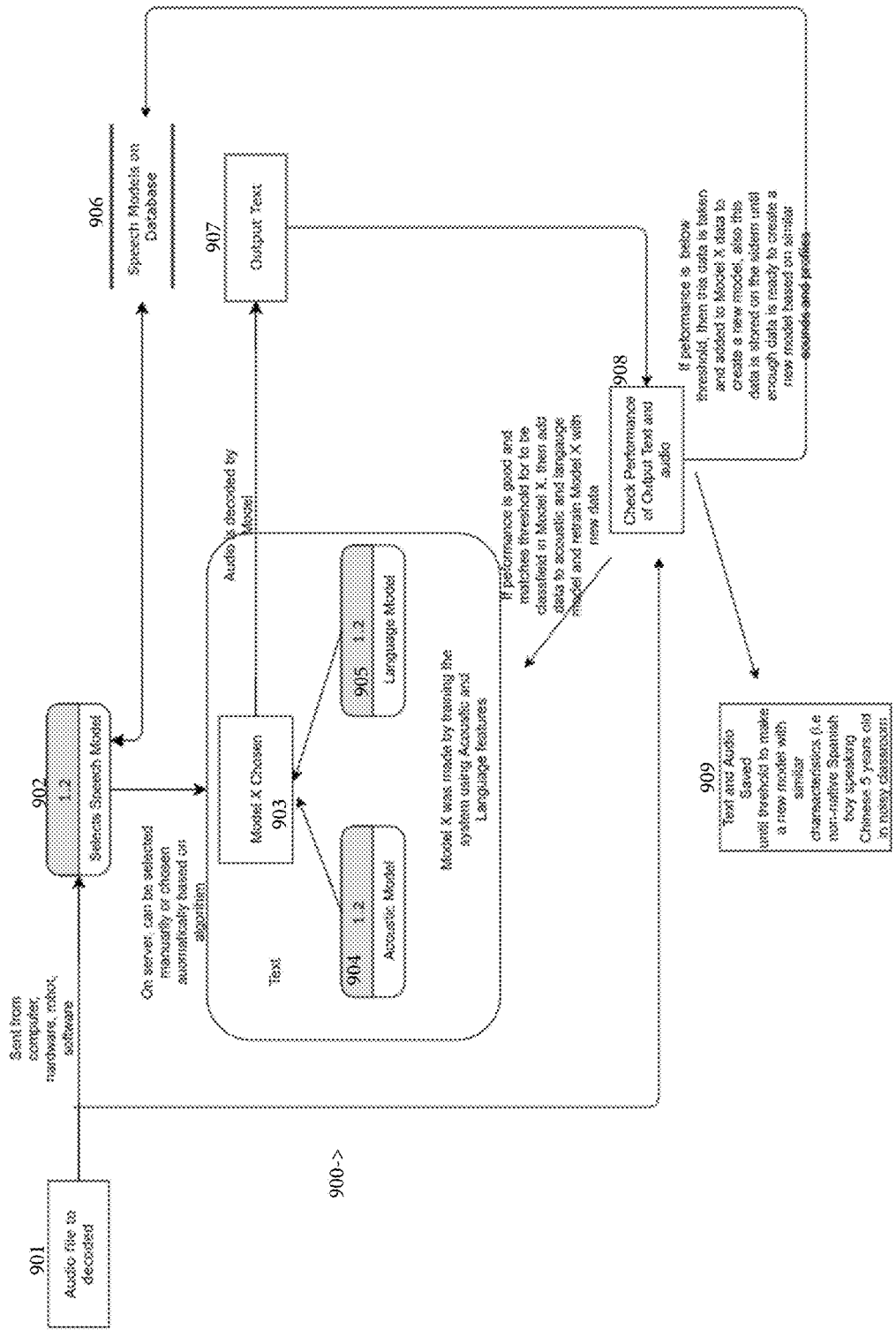
FIG. 9 is a block diagram of a communication flow of the method for automatic speech recognition using selection of speech models based on input characteristics.

FIG. 9 is a block diagram of a communication flow 900 of the method for automatic speech recognition using selection of speech models based on input characteristics. At block 901, an audio file is decoded. At block 902, a speech model is selected. At block 903, an acoustic model 904 and a language model 905 are used in the speech model to decode the audio. At block 907, the text is outputted. At block 908, the performance of the output text and audio is verified. At block 909, the text and audio is saved.

Figure 10:
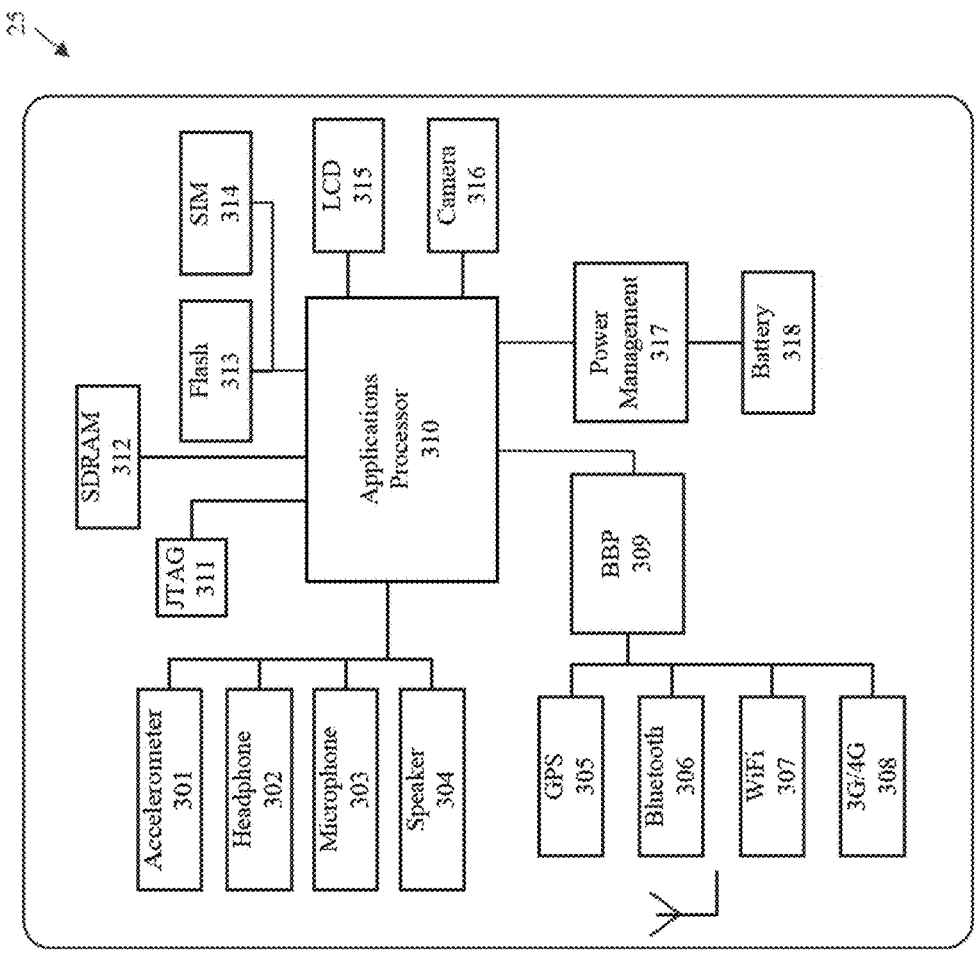
FIG. 10 is a block diagram of components for a mobile communication device.

As shown in FIG. 10, a typical mobile communication device 25 includes an accelerometer 301, a headphone jack 302, a microphone jack 303, a speaker 304, a GPS chipset 305, a Bluetooth component 306, a Wi-Fi component 307, a 3G/4G component 308, a Baseband Processor (for radio control) 309, an applications (or main) processor 310, a JTAG (debugger) 311, a SDRAM memory 312, a Flash memory 313, SIM card 314, LCD display 315, a camera 316, a power management circuit 317 and a battery or power source 318.

The mobile devices utilized with the present invention preferably include mobile phones, smartphones, tablet computers, PDAs and the like. Examples of smartphones and the device vendors include the IPHONE® smartphone from Apple, Inc., the DROID® smartphone from Motorola Mobility Inc., GALAXY S® smartphones from Samsung Electronics Co., Ltd., and many more. Examples of tablet computing devices include the IPAD® tablet from Apple Inc., and the XOOM™ tablet from Motorola Mobility Inc.

A mobile communication service provider (aka phone carrier) of the customer such as VERIZON, AT&T, SPRINT, T-MOBILE, and the like mobile communication service providers, provide the communication network for communication to the mobile communication device of the end user.

Wireless standards include 802.11a, 802.11b, 802.11g, AX.25, 3G, CDPD, CDMA, GSM, GPRS, radio, microwave, laser, Bluetooth, 802.15, 802.16, and IrDA.

Figure 11:
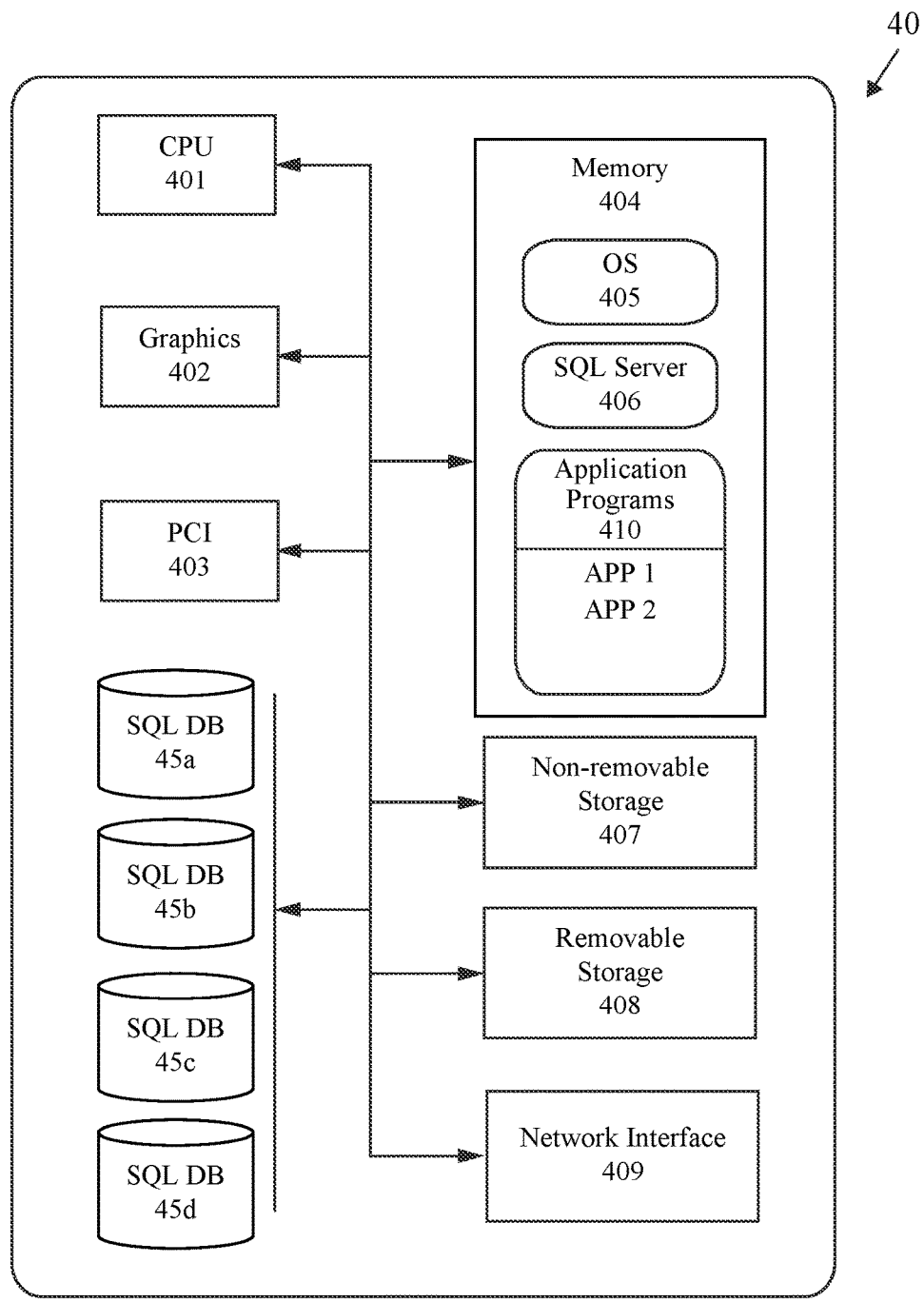
FIG. 11 is a block diagram of components for a server.

FIG. 11 shows components of a server 40. Components of the server 40 includes a CPU component 401, a graphics component 402, PCI/PCI Express 403, a memory 404, a non-removable storage 407, a removable storage 408, a network interface 409, including one or more connections to a fixed network, and SQL databases 45a-45d. Included in the memory 404, is an operating system 405, a SQL server 406 or other database engine, and application programs/software 410. The server also includes at least one computer program configured to receive data uploads and store the data uploads in the SQL database. Alternatively, the SQL server can be installed in a separate server from the venue server.

Communication protocols utilized with the present invention may preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A method for automatic speech recognition using selection of a speech model based on input characteristics, the method comprising:
   obtaining speech data from a speaker utilizing a microphone or an audio upload;
   receiving speaker data and environmental data;
   extracting a plurality of sound features from the speech data wherein the plurality of sound features comprises at least two of Spectral Subband Centroids, Zero Crossing Rate, Spectral Centroid Spectral Spread, Spectral Entropy, Spectral Flux, Spectral Rolloff, and Chroma Vector Chroma Deviation;
   classifying the speech data to generate a classified speech data using a speech classifier selected from the group consisting of I-vector, a feedforward neural network, a support vector machine, a random forests, k nearest neighbor kN, a gradient boosting;
   selecting an acoustic model of an automatic speech recognition system for the classified speech data based on the plurality of sound features;
   selecting a language model of the automatic speech recognition system for the classified speed data based on the speaker data and the environmental data;
   decoding the classified speech data into output text utilizing the acoustic model and the language model of the automatic speech recognition system wherein the automatic speech recognition system is at least one of a Gaussian mixture module (GMM), a deep neural network (DNN), DNN-CTC or a RNN;
   identifying a phoneme and a sound map for the classified speech data; and
   updating the selected acoustic model and the selected language model based on the output text, phoneme and sound map.

2. The method according to claim 1 wherein the speaker data and environmental data comprises at least one of a physical location of the speaker, a native speaker, a language learner, a gender of the speaker, and an age of the speaker.

3. The method according to claim 1 wherein at least one of a processor, memory, and GPU is used to extract the plurality of sound features.

4. The method according to claim 1 wherein a context profiler is used to process the speaker data and environmental data.

5. The method according to claim 1 further comprising analyzing the output text using confidence scoring.

6. A system for automatic speech recognition using selection of speech model based on input characteristics, the system comprising:
   a server comprising a processor;
   a sound feature extractor;
   a context profiler;
   a speech classifier selected from the group consisting of I-vector, a feedforward neural network, a support vector machine, a random forests, k nearest neighbor kN, a gradient boosting;
   a database comprising speech model data, a plurality of speech models, and a speech recognition system;
   wherein speech data from a speaker is obtained utilizing a microphone or an audio upload;
   wherein the context profiler is configured to process speaker data and environmental data;
   wherein the sound feature extractor is configured to extract a plurality of sound features from the speech data, wherein the plurality of sound features comprises at least two of Spectral Subband Centroids, Zero Crossing Rate, Spectral Centroid Spectral Spread, Spectral Entropy, Spectral Flux, Spectral Rolloff, and Chroma Vector Chroma Deviation;
   wherein the speech classifier is configured to classify the speech data to generate a classified speech data;
   wherein a server is configured to select an acoustic model of an automatic speech recognition system for the classified speech data based on the plurality of sound features;
   wherein the server is configured to select a language model of the automatic speech recognition system for the classified speed data based on the speaker data and the environmental data;

wherein the automatic speech recognition system is configured to decode the speech data into output text, wherein the automatic speech recognition system is at least one of a Gaussian mixture module (GMM), a deep neural network (DNN), DNN-CTC or a RNN;

wherein the server is configured to identify a phoneme and a sound map for the classified speech data; and wherein the server is configured to update the selected acoustic model and the selected language model based on the output text, phoneme and sound map.

7. The system according to claim 6 wherein the speaker data and environmental data comprises at least one of a physical location of the speaker, a native speaker, a language learner, a gender of the speaker, and an age of the speaker.

* * * * *